July 26, 1966 J. G. DE BUHR 3,262,212

APPARATUS AND PROCESS FOR FREEZE DRYING

Filed March 11, 1963

INVENTOR
JOHANN G. de BUHR
BY
Jerry Cohen

United States Patent Office 3,262,212
Patented July 26, 1966

3,262,212
APPARATUS AND PROCESS FOR FREEZE DRYING

Johann G. de Buhr, Erlangen, Bavaria, Germany, assignor, by mesne assignments, to United Fruit Company, Boston, Mass., a corporation of New Jersey Filed Mar. 11, 1963, Ser. No. 268,852
18 Claims. (Cl. 34—5)

This invention relates to the processing of food products and other heat-sensitive materials and more particularly to the freeze drying of heat-sensitive products.

At present, freeze drying on a commercial scale has been limited by cost considerations to the drying of heat-sensitive products which are intrinsically very expensive or which can be processed by no other techniques for their preservation. Examples of commercially freeze dried products are antibiotics and expensive food products, such as shrimp and the like. A principal limiting factor has been the time necessary to remove the water vapor from the frozen product. Efforts to increase the speed of drying have involved numerous types of heating techniques, different types of energy input and the like. Despite these approaches freeze drying has, to date, remained a relatively expensive process which can be utilized only when food products must be stored for relatively long periods of time without refrigeration or where costs of shipping under refrigeration are so great that the savings due to elimination of refrigeration costs in transit and storage can constitute a significant economic advantage.

Accordingly, it is a principal object of the present invention to provide an improved freeze drying process which greatly increases the speed of drying without detracting from the quality of the freeze dried product.

Another object of the invention is to provide apparatus which is particularly suitable for providing rapid freeze drying without detracting from the quality of the freeze dried product.

These and other objects of the invention will in part be obvious and will in part appear hereinafter.

For a fuller understanding of the nature and objects of the invention, reference should be had to the following detailed description taken in connection with the accompanying drawings wherein.

In the freeze drying process the product is initially frozen, then vacuum dried. The freezing may be done outside the drying chamber, as in a cold room, or within the drying chamber, as by evaporative freezing. The product to be freeze dried may be initially in solid or liquid form. When in liquid form, it is solidified during the initial freezing stage. One preferred technique for freezing liquids is the known shell freezing technique for freezing the liquid as a solid of thin cross-section. The frozen product is subjected to vacuum and heating in the drying chamber. The heating is generally done by radiant heaters. However, it may be done by contacting the product with a heater.

The volatile constituent of the product to be removed is usually water, as in the case of food products. However, the freeze drying process can be applied to heat sensitive products, such as pharmaceuticals, where it is sometimes desired to remove a volatile constituent other than water. The process parameters are then adjusted accordingly.

To remove water or other volatile constituent properly, the parameters of the freeze drying process are adjusted so that water vapor sublimes from ice held in the product. The partial pressure of water vapor must be inhibited from rising above the thermodynamic triple point wherein the ice will begin to melt. If this happens the product shrivels into a shrunken form which is unacceptable in food and other products. This last requirement has limited the freeze drying process to long cycles of several hours.

In accord with the present invention, a dry and inert gas is periodically pulsed into the chamber during the process. This causes a temporary rise in heat transfer from the heaters to the product as well as within the product. At the same time the water vapor diffuses well through the dry gas so that its partial pressure does not build up rapidly. The dry gas pressure is not raised so high that it presents a substantial impedance to water vapor travel. If this happened, a water vapor equilibrium exceeding the melting point of ice would be reached. The pulsing of dry gas is repeated cyclically throughout the drying cycle. Use of this technique permits a reduction in drying time in excess of 30%.

Figure 1:
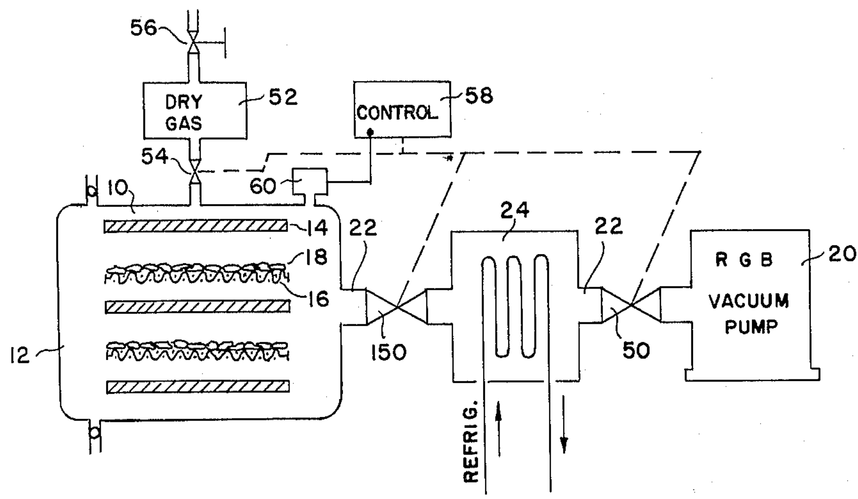
FIG. 1 is a schematic representation of apparatus used for the drying phase of the improved freeze drying process.

Referring now to FIG. 1, there is shown a preferred embodiment of the invention. At the left hand side of the figure, there is shown a vacuum drying chamber 10 with a door 12. Within the chamber are arranged heating platens 14 alternating with mesh shelves 16. Frozen product, indicated at 18, is placed on the shelves. The shelves are slidably removable for loading and unloading between drying runs. The chamber is evacuated by a vacuum pump 20, typically of the rotary gas ballast type, via passage 22. A refrigerated condenser 24 is placed in the passage 22 in series with the pump and chamber to selectively remove water vapor sublimed from the frozen product.

A valve 50 is provided for quickly isolating the vacuum pump from the system. This should be an air operated slide valve. However it will be appreciated that other means may be used for limiting the effectiveness of the pump, such as a variable control on the pump driving mechanism.

A valve 150 is provided for selectively isolating both the condenser and pump from the drying chamber in the manner described below:

Turning now to the improvement in apparatus arrangement provided by the present invention, there is provided a source 52 of dry gas with a valve 54 for selectively admitting the gas to the chamber and a refill valve 56. A control 58 automatically schedules the opening and closing of valves 50 and 54 in accord with a predetermined time sehedule and pressure in the drying chamber 10, as measured by a pressure gauge 60. The control 58 can also schedule the valve 150, if necessary.

Figure 2:
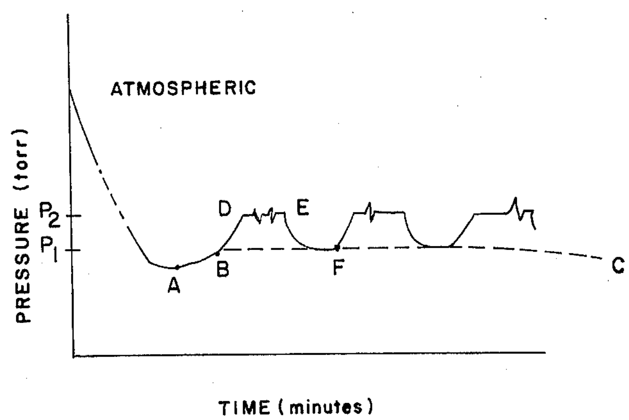
FIG. 2 is an approximate curve of the pressure time reationship demonstrating the steps of the drying process.

Referring now to FIG. 2, the operation of the above apparatus is shown on a pressure-time trace. The total pressure in chamber 10 is initially at atmospheric as the product is loaded and the door 12 is closed; valves 150 and 50 are open, valve 54 is closed and pump 20 is off. The heaters 14 are turned off. Refrigerant circulated through condenser 24 maintains it at a temperature of about −35° F.

The pump is switched on and the chamber is evacuated to a pressure on the order of a few mm. Hg abs. in less than 10 minutes. At point A, the heaters 14 are turned on to produce a heater temperature of about 300° F. The product is spaced about one inch from each of its associated heaters. Water vapor is sublimed from the product. After a transient instability, this results in an equilibrium, at pressure $P_1$, and the total pressure would approximate the dashed line B–C if no further process steps were applied. However, at point B, the control 58 is put into effect. The control closes valve 50 to isolate the pump from the chamber and opens valve 54 to admit the dry gas to the chamber. The condenser continues to remove water vapor, but the total pressure rises due to the admission of dry gas without any means for pumping it. The pressure rise continues until a desired $P_2$ is reached at point D. Then the pressure gauge 60 signals the control to limit the pressure rise. This is accomplished by partially opening the valve 50. Pressure $P_2$ is maintained for a few minutes. However, it should be understood that the process is really a dynamic one, as indicated by the wavering line D–E. At point E the control 58 completely closes valve 54 and opens valve 50 to pump the chamber down again until point F where the cycle is repeated.

The dry gas is selected from the group comprising nitrogen, hydrogen, air, carbon dioxide and the noble gases. These gases have high thermal conductivity characteristics. At the same time, they also have good properties of interdiffusion with water vapor. Thus they present minimal impedance to the removal of water vapor from the product by the refrigerated condenser. The two outstanding gases in this group are hydrogen and helium. The diffusion coefficient of hydrogen is .000202 sq. ft./hr. at 20° C. and one atmosphere and slightly lower for helium. Other gases are below about .00008 (Chemical Engineers Handbook; Perry, ed.; McGraw-Hill, New York, 9th ed., 1941; p.1169). Within the food product, the diffusion coefficients would be about one-tenth of these values. The thermal conductivity in (B.t.u.)(ft.)/(h.)(sq. ft.)(° F.)

is .100 for hydrogen and slightly less for helium. Other gases are below about .03 (Chemical Engineers Handbook, ibid., p. 906). All the above gases, except air, are essentially inert in that they will not react chemically with the product. Where oxidation is not a problem, air may be regarded as inert. All the above gases are dry in the sense that no more than a small percentage of water vapor is carried therein in commercially available form.

Helium is an expensive gas. However, the reduction in cycle time afforded by pulsing helium justifies the additional cost. Moreover, helium can be conserved, as by recirculation through a condenser. The helium can be extracted from the chamber 10 via condenser 24 and recirculated back to valve 56 or extracted from chamber 10, passed through an auxiliary dryer, as shown in Patent 2,435,503 to Levinson and Oppenheimer, and recirculated back to valve 56 of FIG. 1. In either case, a reservoir should be provided so that the periodic pulsing of total pressure in chamber 10 can be carried out. Another technique for economic conservation of helium is that shown in the copending application of Kan, S.N. 320,343, filed October 31, 1963.

Hydrogen is less expensive than helium. When using hydrogen as the dry gas, it is preferred to let the used hydrogen exhaust to atmosphere through pump 20 rather than attempt to conserve it by recirculation. The flammability of hydrogen requires some safety precautions.

Referring to FIG. 2 again, the refrigerated condenser would be operated so that the pressure $P_1$ would be below 4 mm. Hg abs., where water vapor is the volatile constituent to be removed. The use of dry gas, such as helium or hydrogen, in accord with the pulsing technique of the invention allows a $P_2$, intermittently maintained, on the order of 8 mm. Hg abs. It is preferred to make the dry gas pulsing a regular cycle. However, the pulses of dry gas can be made randomly with some benefit thus gained.

Referring now to FIG. 1, there is shown a valve 150 which cuts the chamber off from the condenser. This can be operated from time to time by control 58 to make indirect temperature measurements by the technique described in U.S. Patent 2,994,132 to Neumann. The measurement function of valve 150 does not form part of the present invention. The essence of the present invention is to avoid presenting a substantial impedance to removal of water vapor. This is generally done by closing valve 50 while admitting the helium or other dry gas. However, substantial benefit can be obtained by the alternative technique of closing the valve 150 while admitting helium since the increased partial pressures of both helium and water vapor will improve thermal conductivity. The rate of increase of the partial pressure of water vapor within the frozen product will be limited by the high interdiffusivity of water vapor and helium. This alternative technique presents a greater danger of melting of the ice. Therefore, it is preferred to use the technique wherein valve 50 is closed periodically as dry gas is admitted to the drying chamber while valve 150 remains open. Thus the refrigerated condenser 24 continues to act on the system during the residence time of dry gas and positively limits the rate of increase of the partial pressure of water vapor by removing it from the system.

The effectiveness of the technique of pulsing dry gas in accord with the preferred embodiment of the present invention is demonstrated by the following non-limiting examples.

*Example 1*

Frozen shrimp were dried in several series of runs. Each series was done in accord with the pressure and temperature cycles indicated in the table below. The refrigerated condenser was maintained at −60° F. for all the runs of the 9 series. The heating platens were spaced about one inch from the shrimp to be dried which varied in weight between about 10 to 15 grams each. Shrimp were treated singly and in arrangements where surrounded by four other shrimp. As an aid in reading the table series #6 is described as an example. In the runs of this series, the equilibrium pressure $P_1$ in the chamber after turning on the heaters was .03 torr (mm. Hg abs.). This was held for 3 hours. Then valve 50 was closed and valve 54 was opened to admit nitrogen to the system. The total pressure rose quickly to 2 torr and this was held for 5 minutes, followed by a 5 minute pumpdown to get the pressure back to .3 torr, followed by a second pulse of nitrogen in the same fashion. The pulsing of nitrogen was thus continued at a rate of 6 pulses per hour for the last 3½ hours of the cycle. After the runs, the shrimp were baked overnight and the weight loss noted as a measure of residual moisture. Mean values for the several runs of series 6 are noted below as 1.04% for single shrimp and 5.05% for surrounding shrimp. In all the series of runs, the temperature of the heaters 14 was maintained at 300° F. for the first 1½ hours and at 150° F. for the remaining 5 hours of the cycle.

| Series | Total Pressure cycle | Introduction of Gas | | Results—Mean Residual Moisture (Percent) | |
|---|---|---|---|---|---|
| | | Gas Introduced | Rate of Pulsing | Single Shrimp | Surrounded Shrimp |
| #1 (Control) | 03. torr for 6½ hrs | None | | 2.82 | 9.4 |
| #2 | .03 torr for 3 hrs. followed by adding gas to produce 2 torr-held for 3½ hrs. except Helium which was held at 8 torr for 3½ hrs.). | Nitrogen | | 2.12 | 8.47 |
| #3 | | Argon | | 1.95 | 6.53 |
| #4 | | Helium | | 1.33 | 2.38 |
| #5 | | Water vapor | | 2.15 | 10.16 |
| #6 | .03 torr for 3 hrs. followed by pulsing to 2 torr by the addition of gas (8 torr for Helium) for 3½ hours. | Nitrogen | 6 per hr. (each pulse comprising 5 minutes at elevated pressure; 5 minutes pumpdown—5/5). | 1.04 | 5.05 |
| #7 | | Argon | | 1.14 | 4.27 |
| #8 | | Helium | | 0.45 | 0.41 |
| #9 | | Water vapor | | 2.33 | 6.36 |

The method of increasing pressure in series 5 and 9 differed from that of series 2–4 and 6–8. In series 5 and 9, no gas was added via valve 54. The valve 150 was simply shut to increase the pressure in chamber 10.

It will be appreciated that series 6, 7 and 8 were in accord with the present invention. In each of these cases, the residual moisture was less than that obtainable in control series 1, the only difference being that a dry gas was pulled in series 6–8. In series 9 water vapor was pulsed. Although this affords some improvement, it is not as good as the pulsing of a dry gas in terms of resultant residual moisture and it poses the danger that ice trapped in the product may begin to melt unless the process is very carefully controlled. Holding a partial pressure of dry gas, as in Series 2–4, provides less improvement than the technique of the present invention.

The low residual moisture indicates that the time of the drying cycle can be shortened from the 6½ hours used in the above Example 1. This is confirmed by the following non-limiting example:

*Example 2*

Shrimp were dried in the same manner as in Example 1 save for the changes indicated in the following table:

In accord with the invention it is preferred to pulse the dry gas throughout the drying run as a regular cyclic series of pulses. The rate of pulsing should be less than two pulses per minute and greater than two pulses per hour. It is not necessary to pump the chamber back down to the equilibrium pressure at the end of each pulse. It is generally satisfactory to pump back down to 1 mm. Hg when removing water from food product. This allows considerable saving in the pumpdown time since the pumpdown curve is hyperbolic in form. Thus a higher rate of pulsing can be provided if desired.

It can also be shown that it is desirable to make the pulse peak pressure $P_2$ as high as the nature of the dry gas will permit.

*Example 4 (Series 13)*

Shrimp were dried as in series 11 of Example 2 save that the helium was pulsed to 2 torr rather than 8 torr. This resulted in a mean residual moisture of 1.40% for single shrimp and 5.00% for surrounded shrimp.

Comparing the results of Example 4 with series 11 of Example 2, it will be apparent that it is desirable to add a higher partial pressure of dry gas.

| Series | Total Pressure Cycle | Introduction of Gas | | Results—Mean Residual Moisture (Percent) | |
|---|---|---|---|---|---|
| | | Gas | Rate of Pulsing | Single Shrimp | Surrounded Shrimp |
| #10 | .03 torr for first 3 hours followed by holding at 8 torr for 2½ hrs. | Helium | | 5.02 | 9.77 |
| #11 | .03 torr for first 3 hrs, followed by pulsing to 8 torr for 2½ hrs. | Helium | 6 per hour (5/5) | 0.72 | 1.68 |

The heater temperature was maintained at 300° F. for the first 1½ hours and at 150° F. for the remaining 4 hours.

Series 11, done in accord with the invention, was a full hour less than the control series 1 of Example 1 above, yet resulted in a much lower residual moisture.

In Examples 1 and 2, the pulsing was done during the latter half of the cycle. Yet this is not a limitation of the process. The pulsing can be done at the beginning of the cycle, as shown by the following non-limiting example:

*Example 3 (series #12)*

Shrimp were dried as in series 11 of Example 2 with the exception that the pulsing was done during the first 2½ hours of the cycle followed by holding at .03 torr for the last 3 hours of the cycle. This resulted in a mean residual moisture of 0.61% for single shrimp and 1.85% for surrounded shrimp.

Finally, it can be shown that the dry gas pulsing of the present invention can provide greatly reduced times of drying under commercially feasible conditions, as in the following non-limiting example:

*Example 5*

Shrimp were dried in accord with the following parameters:

Refrigerated condenser temp.: −35° F. (corresponding equilibrium pressure for water vapor; 0.15 torr), total cycle time: 4½ hours for series 14 and 15, 4 hours for series 16. Heater temperature cycle: 300° F. for the first 1½ hours followed by 150° F. for the remaining 3 hours of series 14 and 15, the remaining 2½ hours of series 16.

The remaining parameters and results are shown in the following table:

| Series | Total Pressure Cycle | Introduction of Gas | | Mean Residual Moisture (Percent) | |
|---|---|---|---|---|---|
| | | Gas | Pulsing Rate | Single Shrimp | Surrounded Shrimp |
| #14 | Held at .15 torr for 2 hours followed by 2½ hours of pulsing to 8 torr. | Helium | 4 per hr. (10 min. at 8 torr, 5 min. pumpdown). | 1.20 | 5.40 |
| #15 | | do | 7.5 per hour (.3 min. at 8 torr, 5 min. pumpdown). | 1.20 | 5.44 |
| #16 | 4 hours of pulsing to 8 torr | do | 6 per hour (5 min. at 8 torr, 5 min. pumpdown). | 1.24 | 5.93 |

The total cycle time of series 14 and 15 is a full two hours less and the time of series 16 is 2½ hours less than that of series 1. Yet the residual moisture is less for series 14–16 than for series 1.

It will be appreciated that several other variations may be made within the scope of the invention. For instance, the refrigerated condenser 24 could be replaced by a dessicant chamber. Therefore, it is intended that all matter contained in the above description or shown in the above drawing, shall be interpreted as illustrative, and not in a limiting sense.

What is claimed is:

1. An improved freeze drying system of the type comprising a chamber, means for supporting heat sensitive product in the chamber, means for heating the product, vacuum pump means for producing a vacuum in the chamber, means for selectively removing water vapor from said chamber, whereby said means cooperate to limit total pressure in the chamber, the improvement comprising:

(a) means for limiting the effectiveness of the said vacuum pump means;

(b) means for selectively introducing a dry gas into said chamber;

(c) automatic control means connected to (a) and (b) to cyclically raise the total pressure in the chamber by raising the partial pressure of dry gas.

2. The improved freeze drying system of claim 1 wherein the means (a) only limits the effectiveness of said vacuum pump means, while the means for selectively removing water vapor continues to operate.

3. The improved drying system of claim 2 wherein the vacuum pumping means comprises a rotary pump located outside the chamber and the chamber is connected to the pump via means forming a passage.

4. The improved freeze drying unit of claim 3 wherein the means for limiting the effectiveness of the vacuum pumping means comprises a valve located in said passage.

5. The improved drying unit of claim 4 wherein the means for selectively removing water vapor comprises a refrigerated condenser located upstream of said valve.

6. The improved drying unit of claim 5 wherein the surface condenser and valve are located in series in the passage means.

7. In a process of freeze drying heat sensitive products wherein the product is frozen and the frozen product is maintained in a chamber having a partial pressure of water vapor of less than about 4 mm. Hg abs., the improvement which comprises raising the total pressure within said chamber by an amount in excess of 1 mm. Hg by introducing into the chamber a partial pressure of a dry inert gas selected from the group consisting of hydrogen, carbon dioxide, air, nitrogen and the noble gases and mixtures thereof, meanwhile removing water vapor from the chamber without significantly lowering the partial pressure of the inert gas, then subsequently decreasing the total pressure within said chamber and the partial pressure of the inert gas before the localized pressure of water vapor at the ice surface is raised sufficiently to provide an impedance to water vapor travel which would allow the ice in the product to reach a water vapor equilibrium at high temperatures exceeding the melting point of the ice, said decrease of pressure being an amount in excess of 1 mm. Hg., and repeating this raising and lowering of the partial pressure of the inert gas in the chamber as a series of pulses.

8. The improved drying process of claim 7 wherein the pulses are repeated in a regular, cyclic pattern.

9. The improved drying process of claim 7 wherein the inert gas is helium.

10. In a process for freeze drying heat sensitive product to remove a volatile constituent wherein the product is frozen and the frozen product is maintained in a drying chamber having a partial pressure of the volatile constituent sublimed from the product sufficiently low to prevent melting of the constituent, the improvement which comprises introducing into the chamber a partial pressure of a noncondensible gas while limiting the rate of increase of the partial pressure of volatile constituent due to sublimation then decreasing the partial pressure of the noncondensible gas after a predetermined time, and repeating the raising and lowering of the partial pressure of inert gas in the chamber as a series of pulses.

11. The process of claim 10 wherein the gas is selected from the group consisting of helium and hydrogen.

12. The process of claim 10 wherein the volatile constituent is water and the pulsing is carried out in repetitive, cyclic fashion over at least a substantial portion of the drying cycle with the pulse rate being less than two pulses per minute.

13. The process of claim 12 wherein the pulse rate is greater than two pulses per hour.

14. The process of claim 10 wherein the step of limiting the rate of increase of partial pressure of the volatile constituent comprises removing said constituent.

15. Freeze drying apparatus for vacuum drying heat-sensitive products wherein the product while frozen is maintained in a chamber having a partial pressure of water vapor of less than 4 mm. Hg abs., the apparatus comprising means for evacuating said chamber to a total pressure substantially less than 4 mm. Hg abs., comprising a non-condensible-gas pumping system, means for isolating said gas pumping system from said chamber, a water vapor removing system which is ineffective to pump noncondensible gas, means for introducing a partial pressure of an inert noncondensible gas to said freeze drying chamber, means for heating the product to be freeze dried, automatic control means connected to said isolating means and said gas introducing means and adapted to (a) isolate said pumping system from said chamber after an initial pumpdown of the chamber to less than 4 mm. Hg abs. total pressure and (b) introduce a partial pressure of dry, inert gas into said chamber to provide a total pressure in exces of 1 mm. Hg abs., the water vapor pumping system remaining in effect while said inert gas pressure is increased, said control means operating the isolating means to expose the chamber to the pump after a predetermined period of time less than about 30 minutes and greater than about 30 seconds, said control means being effective to repetitively produce such a cycle during at least a substantial portion of the total drying time.

16. The apparatus of claim 15 wherein the means for introducing gas introduces a dry gas selected from the group comprising $CO_2$, $N_2$, air, $H_2$ and the noble gases.

17. The apparatus of claim 15 wherein the dry gas is selected from the group consisting of hydrogen, helium and other gases having thermal conductivity and diffusivity (in water vapor) coefficients in excess of those of helium and the control means is constructed to control the introduction of dry gas to provide a total pressure in excess of 4 mm. Hg abs.

18. An improved freeze drying system comprising a drying chamber connected to a vacuum pump via a passage, a refrigerated condenser connected to said passage for removing water vapor therefrom, and a valve in said passage for isolating the chamber and condenser from the pump, means for charging the chamber with a dry gas selected from the group comprising nitrogen, argon, hydrogen, helium and mixtures thereof, and control means enabling the creation of a pulsing pressure condition, said control means adapted to periodically raise the pressure in said chamber by introducing dry gas from said means for charging said chamber, and by simultaneously closing said valve.

References Cited by the Examiner

UNITED STATES PATENTS

| | | | |
|---|---|---|---|
| 1,993,062 | 3/1935 | Kiesskalt | 34—191 |
| 2,248,634 | 7/1941 | Krause | 34—5 |
| 2,414,940 | 1/1947 | Flosdorf et al. | 34—5 |
| 2,435,503 | 2/1948 | Levinson et al. | 34—5 |
| 2,528,476 | 10/1950 | Roos et al. | 34—5 |
| 3,077,036 | 2/1963 | Neumann | 34—5 |
| 3,192,643 | 7/1965 | Rieutord | 34—54 |

WILLIAM J. WYE, *Primary Examiner.*

NORMAN YUDKOFF, *Examiner.*

F. E. DRUMMOND, *Assistant Examiner.*